Figure 2:
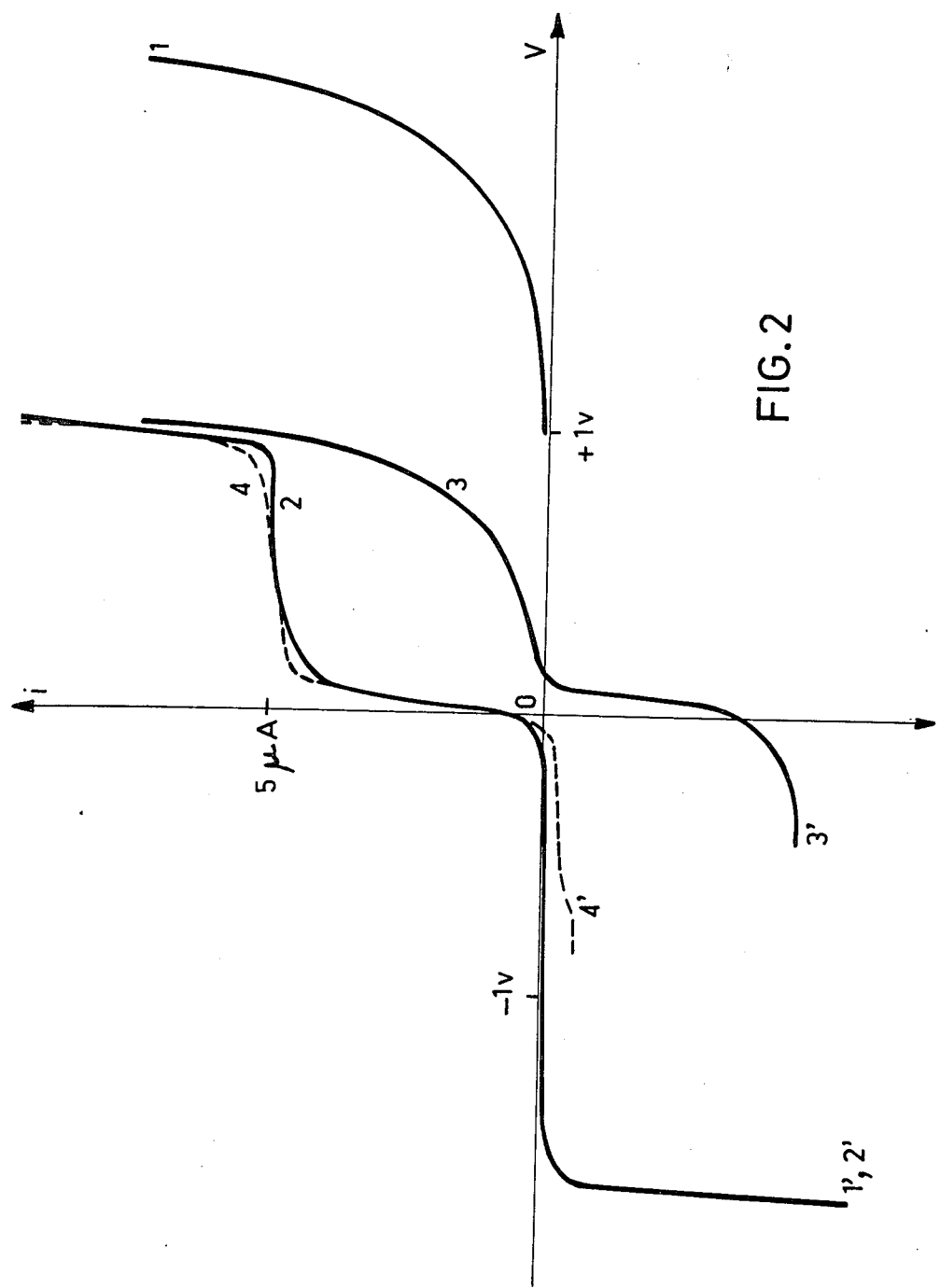

United States Patent [19]

Barret et al.

[11] 3,990,984
[45] Nov. 9, 1976

[54] LIQUID CRYSTAL MATERIAL WITH STABILIZING AGENT

[75] Inventors: Serge Barret, Eybens; Lucette Cahen, Meylan; Francois Gaspard, Grenoble; Roland Herino, St. Ismier; Francois Mondon, Grenoble; Henry Seinera; Gerard Pierre, both of St Martin D'Heres; Denis Serve, Fontaine, all of France

[73] Assignee: Agence Nationale de Valorisation de la Recherche (ANVAR), Neuilly-sur-Seine, France

[22] Filed: Apr. 3, 1975

[21] Appl. No.: 564,810

[30] Foreign Application Priority Data
Apr. 5, 1974 France .............................. 74.12109

[52] U.S. Cl. .......................... 252/299; 350/160 LC
[51] Int. Cl.² ...................... C09K 3/34; G02F 1/13
[58] Field of Search .................. 252/299, 408 CC; 350/160 LC

[56] References Cited
UNITED STATES PATENTS

| 3,803,050 | 4/1974 | Haas et al. | 252/408 |
| 3,806,229 | 4/1974 | Schoot et al. | 252/408 |
| 3,814,700 | 6/1974 | Aviram et al. | 252/408 |
| 3,838,059 | 9/1974 | Wong | 252/299 |
| 3,932,298 | 1/1976 | Labes | 252/299 |
| 3,950,264 | 4/1976 | Jones, Jr. | 252/299 |

OTHER PUBLICATIONS

Baise, A.I., et al., Appl. Phys. Lett., vol. 21, No. 4, pp. 142–143 (8/15/72).
Ohnishi, Y. et al., Appl. Phys. Lett., vol. 24, No. 5, pp. 213–216 (3/1/74).
Foster, R., Organic Charge–Transfer Complexes, Academic Press, N.Y., pp. 1–12, 303–325, 384–395, pp. 52–53 (1969).

Primary Examiner—Benjamin R. Padgett
Assistant Examiner—T. S. Gron
Attorney, Agent, or Firm—Flynn & Frishauf

[57] ABSTRACT

Liquid crystals subjected to an electric field are stabilized by the addition of an electrochemically active and chemically stable material capable of undergoing reversible oxidation-reduction at the electrodes applying the field to the material. The invention is particularly for use in converting electric signals to optical signals.

11 Claims, 5 Drawing Figures

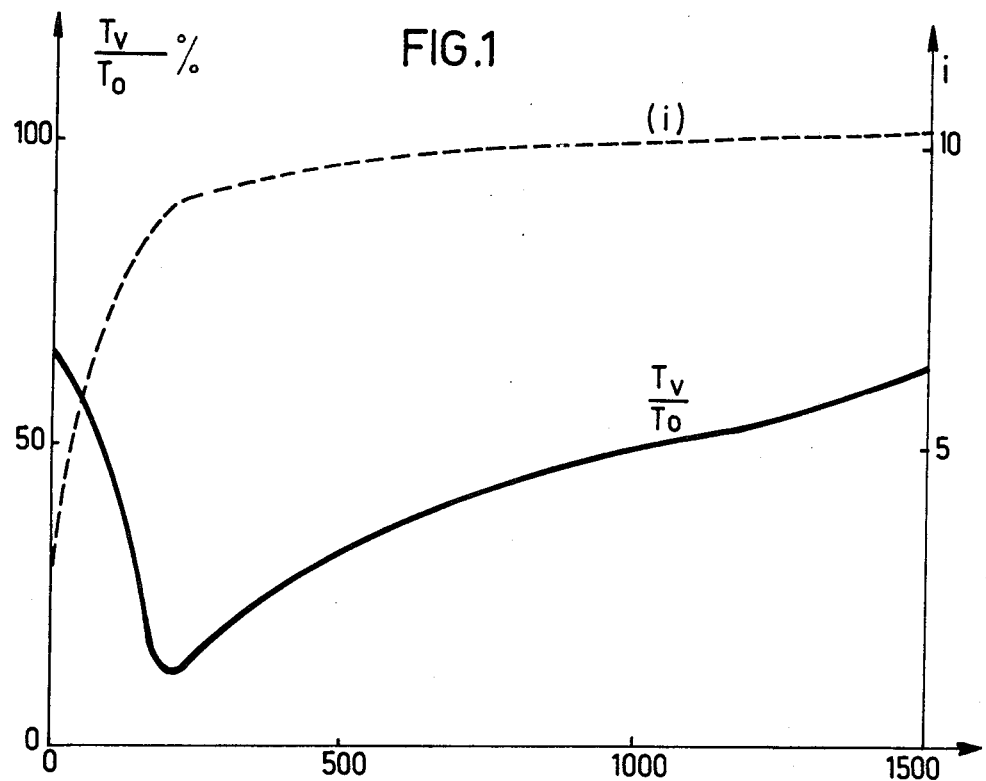
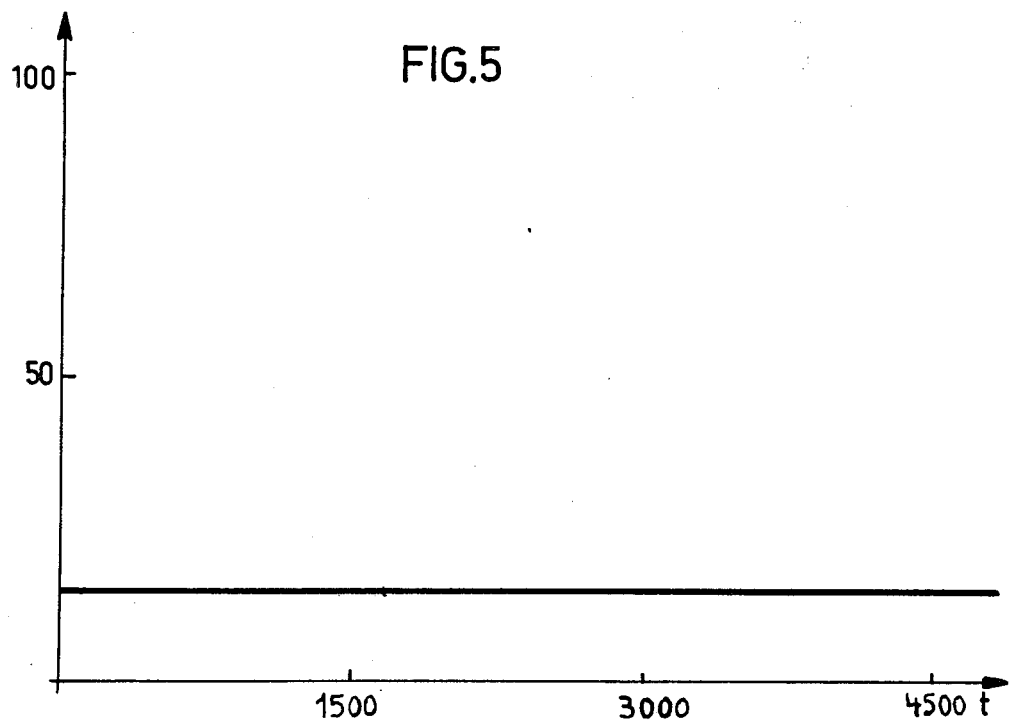

LIQUID CRYSTAL MATERIAL WITH STABILIZING AGENT

The present invention relates to materials in the mesomorphic state, better known by the name of liquid crystals, and particularly materials of this class comprising at least one active organic chemical compound having a substantially elongated molecular configuration such as, for example, methoxyphenyl-azoxy-butyl-benzene.

Liquid crystals are classifiable in three categories according to their general symmetry, namely nematic, cholesteric and smectic. All have anisotropic physical properties which various physical or chemical agents are capable of modifying locally or throughout with great facility. These characteristics give rise to technological applications as numerous as they are varied, in particular making possible the transformation of signals of very diverse character into optical signals.

Two distinct processes are presently utilized to modify the optical properties of a liquid crystal by means of an electric field. On the one hand there are methods utilizing the dynamic scattering of light by a liquid crystal, known as DSM, which stands for "Dynamic Scattering Mode" and, on the other hand, there are methods utilizing the effect of an electric field on the dipole moment of liquid crystal molecules, particularly the method known under the name of "twisted nematics". In both bases the electric field is a means for modifying and for altering the initial orientation of the liquid crystal, and hence for affecting its optical properties:

either by direct action on the dipole moment of the molecules: "twisted nematics" for example, or else by indirect action, by means of electrically charged chemical compounds put into movement under the effect of the electric field and thus disturbing the original orientation of the liquid crystal: DSM effect.

For clarity of explanation there will be considered below only the DSM effect, although as mentioned below, the practice of the present invention is not limited to the utilization of this effect nor even to a particular type of liquid crystal.

The dynamic scattering of light by a liquid crystal can be illustrated by the following basic experiment.

A nematic material is chosen having a negative dielectric anisotropy, which is to say that the static dielectric constant, measured along the optic axis, is smaller than the dielectric constant measured perpendicularly to that axis. This material is placed between two semitransparent plane electrodes (spaced apart, for example by 30 microns) and this liquid crystal is initially oriented parallel to the electrodes by rubbing the electrodes on a sheet of paper; thereafter, a potential V is applied between these electrodes.

When V is less than 5 volts, the nematic material remains homogeneous and transparent.

When V exceeds a first threshold, for example of the order of 5 V, optical observation of the liquid crystal shows a periodic cellular structure. It may be deduced therefrom that above the first threshold the initial nematic arrangement is perturbed.

When V reaches a second threshold, higher than the first threshold, numerous disinclination lines appear and the liquid crystal becomes relatively opaque, which results from the scattering of light in all directions.

The phenomena described above have been satisfactorily explained theoretically only for the range of voltage between a zero electric field and the first threshold defined above. It has however been clearly established that the perturbations produced in the liquid crystal result from hydrodynamic movement of ions present in the nematic substance. In fact, a liquid crystal that is ionically very pure and has a resistivity higher than $10^{11}$ ohm.centimeters does not produce any DSM effect. In other words, the initial orientation of the liquid crystal is modified under the influence of electrohydrodynamic (in abbreviation, EHD) instabilities induced by ionic conduction.

These ions have several origins, among which may be cited:

the thermal dissociation of impurities considered as weak electrolytes, always present in the liquid crystal, no matter how pure it may be. For example, a sample of MBBA (p-methoxybenzylidene-p-n butylaniline) of the kind available in commerce, has a residual conductivity of $2.10^{-10}(\text{ohms} \times \text{cm})^{-1}$;

the oxidation at the anode of an electrochemically active impurity and/or the reduction at the cathode of another electrochemically active impurity.

With d-c current and under steady-state conditions, for relatively high electric fields, for example of the order of a few tens of kilovolts per cm, and for liquid crystals sufficiently pure (resistivity higher than $10^{10}$ ohm . cm) it has been shown that the natural ionic dissociation of impurities should be negligible compared to the electrochemical injection of ions into the liquid crystal (by anodic oxidation and/or cathodic reduction), as a source of electrically charged chemical compounds. In other words, under these particular conditions, the injection of ions at the electrodes and the perturbations used by the latter in the initial nematic order of the liquid crystal constitute the principal cause of the DSM effect. It should be further noted that the DSM effect can be obtained with alternating current so long as the frequency thereof does not exceed 100 Hz. Similarly, the dynamic scattering of light likewise has its origin in the electrohydrodynamic instabilities engendered in the liquid crystal. The ions that initiate these instabilities, however, are essentially those resulting from thermal dissociation of one or more impurities; actually with alternating current, the injection of ions by the electrodes rapidly becomes negligible as soon as the frequency exceeds a few tens of Hertz, either because the double layer necessary for the establishment of every electrochemical reaction does not have the time to form during a half cycle of the current, or else because the injected ions do not have the time to migrate into the mesomorphic material during a half cycle.

Although the mechanisms responsible for the phenomena explained above have not yet been clearly explained, the technological applications of the DSM effect have, in contrast, not been delayed. Since a foil of a nematic substance appears transparent when it is not subjected to any electric field and opaque when it is under potential, numerous electro-optic devices can be produced to transform an electric signal applied to a liquid crystal into an optical signal produced by the latter. Screens of variable transparency can thus be made, and likewise display devices with electrodes having a carefully chosen geometry. These devices can be used regardless of the ambient light conditions, since they scatter the light that they receive. The great interest in liquid crystal devices is that they function at low electric power (of the order of a few microwatts per square centimeter) and under small applied voltages (of the order of a few volts for the field effect devices and of the order of some 20 volts for the DSM devices). All these liquid crystal devices are subject to two related major defects that considerably limit their use in industry and by the general public, namely:

the useful life of the liquid crystal is limited and does not extend beyond one or two years, and often much less;

the efficiency of the liquid crystal is variable with time.

In the presently considered case (DSM effect), this efficiency can be defined, for example, as the ratio of luminous flux transmitted or reflected in the absence of electric field to the flux transmitted under the stress of a field.

These two defects have a common cause in the gradual degradation of the mesomorphic state, which can arise in two ways:

1. the liquid crystal is of low chemical stability, and
2. electrochemical reactions at the electrodes, previously mentioned, gradually alter the liquid crystal.

So far as concerns the first cause, this means that the liquid crystal is degraded by the action of different chemical reactions among which can be cited:

the gradual decomposition of the liquid crystal, with or without producing the appearance of chemical compounds that play a role in its synthesis. This, for example, is the case with p-methoxybenzilidene-p-n butylaniline (MBBA for short), obtained by elimination of water between a carbonyl compound and an amine, and susceptible of being hydrolysed in the presence of traces of water to reconstitute the materials used in its synthesis, i.e. n-butylaniline and p-anisaldehyde. These decompositions can be divided into those susceptible or not of being catalysed by some chemical compound (an impurity for example) present in the liquid crystal. Thus, the hydrolysis just described is catalysed by protons that may be produced by the anodic oxidation of traces of water;

the reaction of the liquid crystal with impurities initially present in the liquid crystal, and/or the impurities appearing in the course of application of electric potential, resulting essentially from electrochemical reactions at the electrodes. In the same manner as above described, these reactions may or may not be catalyzed by some chemical compound present in the liquid crystal. It has been possible in a good many cases to eliminate totally this first cause of the degradation of the mesomorphic matrix, because chemically stable liquid crystals are now known and commercially available. Methoxy-phenyl-azoxy-butylbenzene (MPABB for short) may be cited as an example.

When the term "chemically stable" is thus used, there must be understood for the purposes of the present description and the claims referring thereto, any chemical compound, whether electrically charged or not, maintaining its molecular configuration under its conditions of use. The term relates accordingly to a compound that is:

not susceptible of spontaneous chemical decomposition in its normal conditions of use, for example, ambient temperature, application of electric potential, etc. . . .;

not susceptible of reacting chemically and irreversibly with any other chemical compound with which the former chemical compound is put in contact under its normal conditions of utilization; in the case in which the chemical compound considered is a liquid crystal, its normal conditions of use imply on one hand a preliminary (before use) dehydration and de-oxidation of the liquid crystal, according to usual techniques, such as bubbling a stream of dry nitrogen in the liquid crystal before filling a cell with the latter, and on the other hand, the use of hermetically sealed and vacuum-dehydrated cells; the other chemical compounds referred to are, for example, the original impurities of the liquid crystal and also the impurities coming into play in the course of the use of the liquid crystal in an electric field (ions injected at the electrodes);

not susceptible of catalyzing a chemical decomposition and/or chemical reaction of at least one other chemical compound with which the chemically stable compound under consideration is put into contact.

Of course, this definition does not exclude any elecutrochemical reaction (anodic oxidation and/or cathodic reduction) always possible of the chemically stable compound under consideration. So far as concerns the second cause given above of the degradation of the liquid crystal, it is worth examining more closely the electrochemical phenomena produced at the electrodes (which are assumed to be immune from electrochemical attack), and for the clarity of explanation, for the moment consideration will be limited to a DSM effect obtained by application of a d-c voltage to the electrodes.

There always are in a liquid crystal one or more electrochemically active compounds, that is, compounds susceptible of oxidation in the presence of an anode or of reduction in the presence of a cathode. As above explained, for relatively high potentials, these compounds are necessary because it is they that principally maintain the DSM effect, by being transformed into cations and/or anions perturbing the initial mesomorphic order by the effect of EHD movements. These compounds can be either the active organic chemical compound (methoxy-phenyl-azoxy-butylbenzene for example) or else original impurities, for example traces of water, even those present in infinitesimal quantity.

These different electrochemically active materials, however useful they may be, ineluctably lead to a degradation of the liquid crystal, because they are consumed at the electrodes in a quasi-irreversible manner.

Indeed, if at the anode an easily oxidizable compound gives up an electron, and is thus oxidized, whether or not into a free radical cation, the latter can behave differently according to its chemical or electrochemical stability:

(1) it is chemically stable and it migrates towards the cathode, in the neighborhood of which it accumulates without experiencing any cathodic reduction;

(2) it is chemically stable, but it is reduced at the cathode to become a new and different chemical compound, whether or not ionic, whether or not effective as a radical, distinct from the easily oxidizable starting material;

(3) it is chemically unstable and it then reacts with any chemical compound, ion or not, organic radical ion or not, present in the liquid crystal, to produce a new and different chemical compound, distinct from the electrochemically oxidizable starting material;

(4) and many other processes . . . .

The new chemical compounds produced according to (2) and (3) may themselves in turn be electrochemically active, chemically stable or not, so that they may also participate in numerous secondary processes, electrochemical or chemical.

The same type of mechanisms can be considered as taking place at the cathode for a compound easily reducible.

On the whole, the effect of all these chemical and electrochemical reactions leads to a progressive contamination of the mesomorphic matrix by new chemical compounds altering the liquid crystal in an irreversible manner. In effect, on the one hand the presence in appreciable quantity of non-mesomorphic materials within the mesomorphic matrix leads to a diminution of the degree of ordering of the latter, and on the other hand, these non-mesomorphic materials are deposited on the electrodes and disturb in a significant manner the orientation of the liquid crystal induced by the surfaces of the electrodes.

Figure 3:
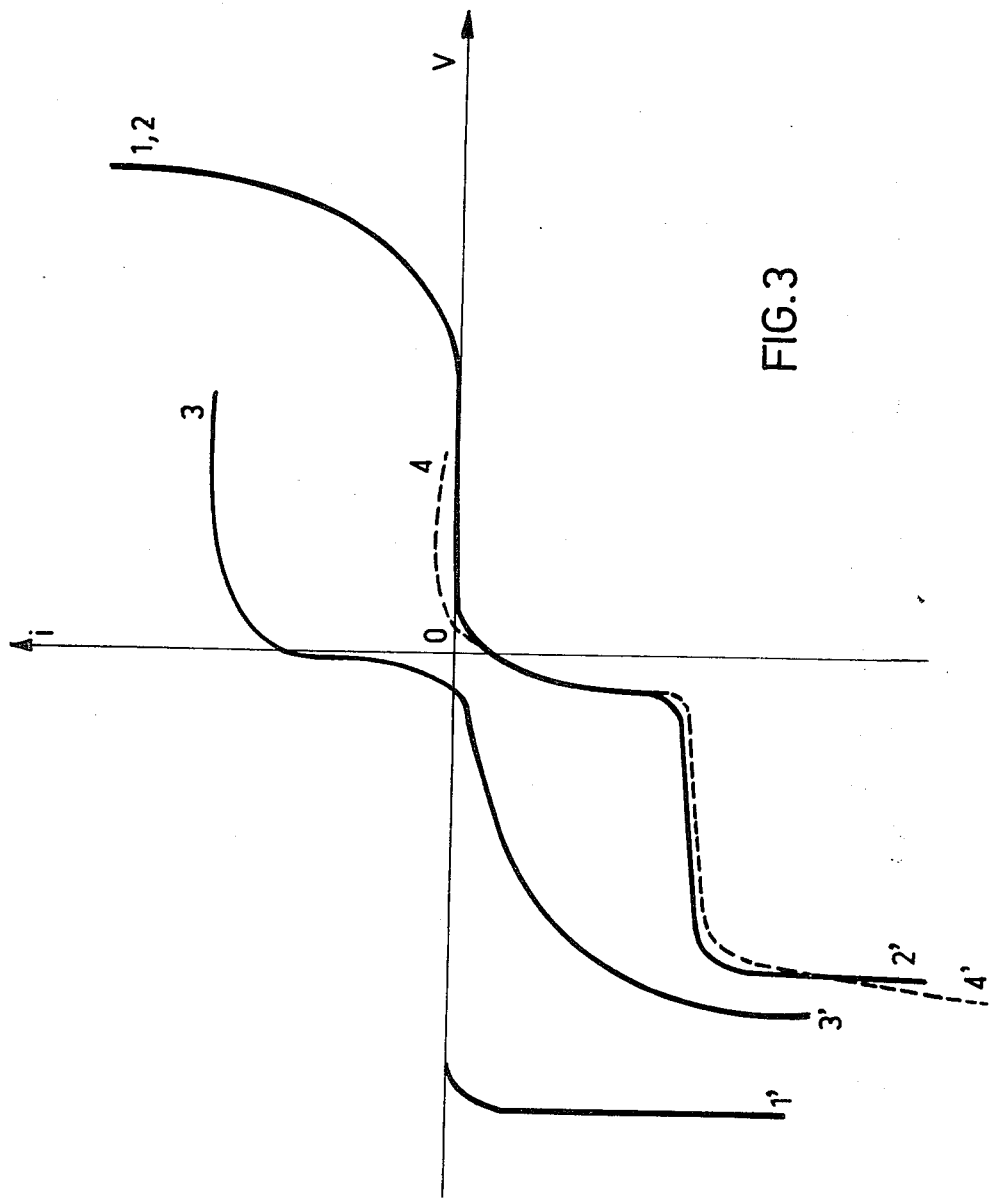
Figure 4:
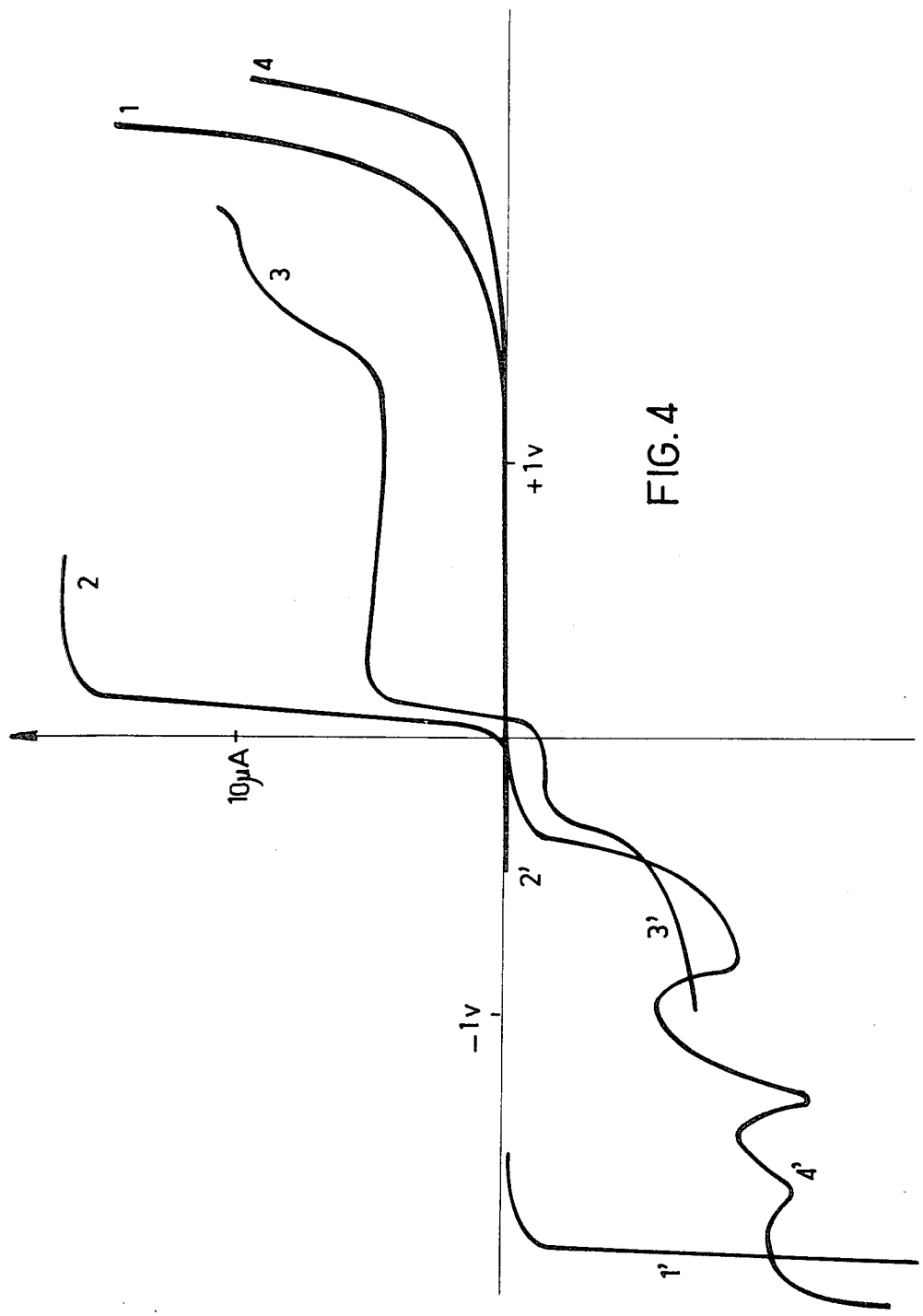

Several relationships are shown in the drawings wherein:

FIG. 1 includes curve Tv/To for relative transmission during time of operation of a liquid crystal cell, and curve (i) for current density during said time;

FIGS. 2–4 include intensity-potential curves; and

FIG. 5 shows Tv/To to be constant during said time when the liquid crystal comprises N-methylated hexamethoxy-diphenylamine.

The preceding considerations can be illustrated by the curves given in FIG. 1 of the annexed drawings, in which there are plotted:

as abscissae, the number of hours of operation of a liquid crystal cell of the sandwich type (two glass electrodes spaced 50 microns apart, coated with a deposited layer of indium oxide between which is disposed a nematic foil of methoxyphenylazoxy-butylbenzene in the racemic form);

as ordinates, at the left, the ratio $T_v/T_o$ expressed in %, $T_v$ being the relative transmission with the continued application (d.c.) of a potential of 40 volts, $T_o$ being the relative transmission in the absence of electric field;

as ordinates, at the right, the current density passing through the liquid crystal, expressed in nanoamperes per cm$^2$.

During the first hour, the liquid crystal is ionically relatively pure, and correlatively the DSM efficiency is relatively mediocre. Then the degradation of the nematic material leads to an increase of its conductivity, and in consequence to an augmentation of the DSM efficiency. After 200 hours, the degradation of the nematic material becomes too great and the DSM efficiency decreases gradually, while the conductivity of the liquid crystal increases progressively. Deposits on the electrodes rendering these last relatively opaque are visually observed.

To mitigate the degradation of the mesomorphic matrix that takes place electrochemically, the great majority of present-day liquid crystal devices utilize alternating voltages to produce the DSM effect. Indeed, an electrochemical reaction can take place only if preliminarily a double ionic layer (positive and negative ions) accumulates in the neighborhood of the corresponding electrode, and if correlatively the electrochemical activation energy is sufficient. If the frequency of the electric current is sufficiently high, the available cations and anions in the mesomorphic matrix do not have the time to migrate during one alternation towards the electrode in question, so that the double layer never has time to be formed; the electrodes can then play no role with respect to any electrochemically active compound. However, the application of an alternating current to a liquid crystal cell never fully suppresses all anodic oxidation and/or all cathodic reduction; this solution thus has the effect of only retarding the degradation of the liquid crystal and to prolong a little (for one to two years, instead of 200–300 hours in the case of d.c.) the useful life of the mesomorphic matrix. Moreover, this solution carries with it technological complications that are by no means negligible; the use of relatively complex electric or electronic circuits is necessary to generate alternating voltages.

On the other hand, the voltages necessary for obtaining the DSM effect are still higher with alternating current than with d.c.

In a general way, the present invention therefore has the object of finding stabilizing agents capable of preventing any degradation of any usable mesomorphic material that is subjected to an electric field, whether d.c. or alternating. More particularly, the present invention has the object of finding stabilizing agents effective to prevent the degradation of a nematic liquid crystal subjected to a d.c. electric field and a fortiori in an a.c. field.

The present invention results directly from the preceding analysis of electrochemical mechanisms leading to the degradation of a liquid crystal and the assimilation of the latter to a substantially insulating dielectric liquid medium in which electric conductivity results principally from electrochemically active compounds.

Subject Matter of the Present Invention

Briefly, a liquid crystal subjected to an electric field is stabilized by the provision of a chemically stable (in the above-defined sense) and electrochemically active stabilizing agent which is reversibly oxidizable-reducible at the electrodes in that it has at least one of the two following electrochemical properties:

a. in the presence of an anode, the stabilizing agent is oxidized at an oxidation potential lower than that of any other chemical compound present in the material, including the active chemical compound of the liquid crystal, to produce a cationic oxidized form which is chemically stable (in the sense defined above); and in the presence of a cathode, the oxidized form of the stabilizing agent is reduced at a reducing potential greater than that of any other chemical compound present in the material, including the aforesaid active chemical compound, to regenerate the stabilizing agent;

b. in the presence of a cathode, the stabilizing agent is reduced at a reducing potential greater than that of any other chemical compound present in the material, including the aforesaid active chemical compound, to produce an anionic reduced form which is chemically stable (in the sense defined above); and in the presence of an anode, the reduced form of the stabilizing agent is oxidized at an oxidation potential lower than that of any other chemical compound present in the material, including that of the aforesaid active chemical compound, to regenerate the stabilizing agent.

In all of the present description, and in the claims, there is meant by oxidation potential and by reduction potential, the so-called "half-wave" potential, determined by the standard and classic methods of electrochemistry (cyclic volt/ampere measurement, polarography, electrolysis under controlled potential, etc . . .), under the following conditions:

except as otherwise indicated, the potentials are determined by reference to an $A_g/A_G^+(10^{-2}M)$ reference electrode, the measuring electrode is of platinum and subjected to a rotary movement (600 r.p.m.), the electrolyte buffer is lithium perchlorate, of a concentration of 0.01 mole per liter, the solvent is acetonitrile carefully distilled and dried on a molecular sieve, and the precision of measurement is of the order of 1%.

By potential higher or lower than a reference potential, it is meant that the aforesaid potential is higher or lower in algebraic value than the reference potential.

The term electrochemically active stabilizing agent is to be understood to mean a chemical compound susceptible of being oxidized in the presence of an anode and/or susceptible of being reduced in the presence of a cathode. In this regard, the stabilizing agent chosen may be said to be double-acting: it concurrently exhibits both of the electrochemical properties (a) and (b) defined above, and it may be called monovalent if it exhibits only one of these defined electrochemical properties. Preferentially, the stabilizing agent chosen is single-acting and exhibits exclusively one or the other of the properties (a) and (b) specified above.

By a chemically stable compound is meant any chemical compound meeting the definition of this term given above.

Two types of liquid crystals can come within the definition of the present invention:

(1) where the material in the mesomorphic state is substantially pure, and in other terms the material comprises only one substantially pure active chemical compound; in this case the only condition to be met with regard to the oxidation/reduction potential is that:

A. the oxidation potential of the stabilizing agent, or that of the reduced form of the said stabilizing agent, should merely be lower than that of this active chemical compound, B. the reduction potential of the oxidized form of the stabilizing agent, or that of the aforesaid stabilizing agent itself, should merely be greater than that of this particular active chemical compound.

This contemplates, for example, the case of a liquid crystal carefully purified by successive recrystallizations, for example in alcohol, followed by drying on a molecular sieve; such a liquid crystal can be still further purified by electrodialysis. The natural conductivity of such a mesomorphic material does not exceed $10^{-11}$ (ohm $\times$ cm)$^{-1}$ at 25° C.

(2) or else the substance in the mesomorphic state is substantially impure, and in other words, the aforesaid material comprises an active chemical compound and at least one other chemical compound, for example an impurity; in that case, the condition to be filled, with respect to oxidation/reduction potential, is that:

C. the oxidation potential of the stabilizing agent, or that of the reduced form of the said stabilizing agent, should be lower with respect to both the oxidation potential of the aforesaid active chemical compound and that of the other said chemical compound. In other words, this oxidation potential is lower than the lowest of the oxidation potentials of the other chemical compounds (including the aforesaid active chemical compound) present in the mesomorphic material, D. the reduction potential of the oxidized form of the stabilizing agent, or that of the stabilizing agent itself, should be higher than both that of the aforesaid active chemical compound and that of the aforesaid other chemical compound. In other words, this reduction potential is higher than the highest of the reduction potentials of the other chemical compounds (including the said active chemical compound) present in the mesomorphic material.

The above requirements relate to liquid crystals actually available in commerce, of which the impurity content is in the neighborhood of $10^{-6}$ and to $10^{-7}$ moles per liter. In the majority of cases, the classic methods of analytical chemistry do not make it possible to distinguish the nature of the impurities present in the liquid crystal, nor even to measure the concentrations of these various impurities. It is, therefore, in general, impossible to determine directly, by means of classic electrochemistry methods, whether the oxidation/reduction potentials of the stabilizing agent selected satisfy the conditions (C) and (D) given above, specifically with regard to a particular impurity, or to impurities present in the liquid crystal.

However, an indirect verification after the fact remains possible. Indeed, as will be seen from the following discussion, if any impurity present in the liquid crystal, for example, has an oxidation potential inferior to that of the chosen stabilizing agent or to that of the reduced form of the latter, that means that this impurity is exclusively oxidized at the anode (assuming, of course, that its diffusion towards that electrode is sufficient), which inevitably leads to a degradation of the liquid crystal, by virtue of the chemical and electrochemical mechanisms above explained. The same considerations hold for an impurity with a reduction potential that is greater than that of the chosen stabilizing agent or than that of its oxidized form. In consequence, a simple test for a duration of the order of 300–400 hours by subjecting a foil of liquid crystal to a d.c. potential that is sufficiently high (for example 50 V) suffices to verify whether the conditions (C) and (D) above defined are fulfilled or not with regard to the impurities present in the liquid crystal. If the transmissibility $T_o$ in the absence of electric field, defined above, is not altered at the end of 300–400 hours, or if no deposit on the electrodes is visually observed, it may be concluded that the conditions (C) and (D) are fulfilled with respect to the impurities present in the liquid crystal. If there is a change of $T_o$ or if a deposit on the electrodes is observed, the conditions (C) and (D) are not fulfilled with regard to the impurities.

In certain cases, however, the nature of the impurities may be determined by particularly refined analytical methods, such as infrared or ultraviolet spectroscopy, nuclear magnetic resonance (NMR), mass spectroscopy, etc. In that case, it will then be possible to choose an appropriate stabilizing agent in terms of the oxidation-reduction potentials of the detected impurities, if the latter are known in the literature or following a determination of these potentials by the classical electrochemical methods.

In a good many cases, the liquid crystal will contain traces of water as impurities. In such cases, the oxidation-reduction potentials of the stabilizing agent chosen must fulfill the conditions (C) and (D) above stated with regard to non dissociated water considered as an impurity. In other terms, the choice of the stabilizing agent must take account of the oxidationreduction potentials of the following electrochemical reactions: at the cathode:

$$2 H_2O + 2 e^- \rightarrow 2 OH^- + H_2$$

(reduction potential equal to −0.6 V, with reference to an $H_2/H^+$ reference electrode),
at the anode:

$$H_2O - 2 e^- \rightarrow 2 H^+ + \tfrac{1}{2} O_2,$$

(oxidation potential equal to +0.9 V, with the reference to an $H_2/H^+$ reference electrode).

By the term impurity, or by the term "other chemical compound" used in the same sense, there is to be understood any additive or any dopant, other than the stabilizing agent of the present invention, designed to modify certain local or overall properties of the liquid crystal. An electrolyte such as isoamyl-ammonium-tetra-phenyl-borate [in abbreviation, ( $(IAM)_4$ $NBPH_4$ )], mixed into the liquid crystal in order to modify its bulk conductivity, corresponds for example to this definition. In this case, the selected stabilizing agent must fulfill conditions (C) and (D) defined above with reference to the chosen additive.

The essential technical effect produced by the present invention is a result of the particular electrochemical properties of the stabilizing agent chosen, which properties have been specified above.

For example, in the case in which the stabilizing agent has the electrochemical properties previously designated as (a), this means that the anode selectively and exclusively oxidizes the stabilizing agent, while the cathode selectively and exclusively reduces the oxidized form of the stabilizing agent, thereby regenerating the starting material, the original form of the stabilizing agent (assuming, of course, a sufficient diffusion of the aforesaid material towards the electrodes). Two immediate consequences result:

(1) whatever the applied voltage, the electrodes can no longer react electrochemically with the active organic chemical compound or the other chemical compounds (e.g. impurities, additives, etc.), other than the stabilizing agent, present in the mesomorphic material. The electrodes, in a way, are masked against the chemical compounds other than the stabilizing agent in this situation. In consequence, the only chemical compounds injected by the anode and the cathode are respectively the oxidized form of the stabilizing agent and the stabilizing agent itself. Since this stabilizing agent and its oxidized forms are chemically stable in the sense previously defined, these chemical compounds undergo no alteration other than electrochemical, and give rise to no irreversible chemical reaction with the other constituents of the liquid crystal. All the other forms of injection at the electrodes previously described and explained, resulting from oxidation-reduction of the active organic chemical compound (i.e. the mesomorphic matrix compound) and/or impurities are eliminated. The upshot of this improvement is that the liquid crystal is no longer susceptible to degradation;

(2) the stabilizing agent is reversibly oxidized. This means that its oxidized form is reduced at the cathode to regenerate the starting material, the original stabilizing agent. An electrochemical cycle is thus produced which is capable of reproducing itself indefinitely and may be diagrammed as follows:

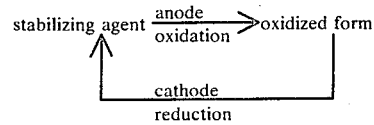

In the course of time, the only electrochemically active compound is thus the stabilizing agent itself, and this electrochemical cycle blocks and prevents any other electrochemical reaction at the electrodes, which might ineluctably lead to a degradation of the liquid crystal.

In the prior art, none of the impurities were reversibly susceptible to oxidation-reduction processes conforming to either or both of the definitions (A) and (B) given above. If there had been such an impurity in any liquid crystal composition of the prior art, any degradation of the liquid crystal would have been ipso facto eliminated.

Thanks to the present invention, liquid crystals now acquire electro-optical properties that are reproducible from one sample to another and are controllable in time. Indeed, all uncontrollable alterations resulting from degradation of the liquid crystal are suppressed and the injection of ions in the mesomorphic matrix becomes, in accordance with the invention, a perfectly stable and repetitive process. In consequence, the efficiency of a DSM effect depends exclusively on the specific and measurable properties of the active organic chemical compound and on those of the stabilizing agent. This constitutes a major step in technical progress in this field.

The principle value of the stabilization of a liquid crystal as provided by the invention resides in the fact that it is no longer necessary to operate liquid crystal electro-optical devices at alternating current. A direct current and d.c. voltages can then be used and the electric and/or electronic circuits interacting with the liquid crystal are considerably simplified, while at the same time reducing the consumption of electric power.

Nevertheless, in view of the fact that at low frequency alternating current, the electrochemical liquid crystal degradation phenomena are not fundamentally different from those occurring with direct current (unless the ions produced at the electrodes do not have the time to migrate appreciably in the mesomorphic matrix), a stabilizing agent in accordance with the invention can be usefully employed to obtain a DSM effect under a.c. energization. For example, the stabilizing agent that is oxidized during one alternation is completely reduced during the next alternation, regenerating itself at the same time, and the electrodes react only with this agent. In consequence, any degradation of the liquid crystal subjected to an alternating electric field is thus suppressed.

Likewise, a stabilizing agent in accordance with the invention can be used to advantage when the optical properties of a liquid crystal are modified by direct action of an electric field on the dipole moment of the molecules of the active organic chemical compound. Indeed, the problem posed, for example, by the "twisted nematics" under either d.c. or a.c. operation, is not fundamentally different from that presented by the task of producing a DSM effect, since in the first case a d.c. or a.c. potential is, likewise, applied to a liquid crystal specimen and this potential is in general the cause of a progressive degradation of the mesomorphic material.

Preferably, in accordance with the invention, the oxidation potential of the stabilizing agent or that of the reduced form of the stabilizing agent is equal to or lower than about $+1$ V; and the reduction potential of the oxidized form of the stabilizing agent or of the stabilizing agent itself is preferably equal to or greater than about $-1.8$ V.

According to a preferred method of practicing the present invention, a concentration of the stabilizing agent is made to fall between $10^{-4}$ and $10^{-2}$ moles per liter, and most preferably it is made equal to about $10^{-3}$ moles per liter. The lower concentration limit defined above is enough to provide a sufficient concentration of the stabilizing agent to enable a continuous diffusion of the stabilizing agent towards the cathode and/or the anode. In other words, it is thus assured that the oxidation-reduction action that take place are only those of the stabilizing agent and not those of any other compounds, as would occur if the diffusion of the stabilizing agent towards the electrodes were insufficient. The upper concentration limit above defined for the preferred practice of the invention is given in terms of avoiding concentration that might be high enough to perturb the initial mesomorphic order of the liquid crystal and its orientation induced by the electrode surfaces.

The further description given below by way of example is intended to set forth the various parameters useful for the selection of various materials that are capable of serving as stabilizing agents in accordance with the invention. It is noted, however, that the scope of the present invention is not to be limited to the materials hereafter defined which fulfill the criteria specified above, because the criteria specified above have been very particularly set forth and a good many other materials may be used if they have the required properties without thereby departing from the concept of the present invention.

It will be supposed that the oxidation and/or reduction potentials of the active organic chemical compound (for example, methoxyphenylazoxy-butylbenzene) are known or have been preliminarily determined by classical electrochemical methods.

In accordance with the above discussion, a material selectable as a stabilizing agent for a liquid crystal must essentially fulfill all of the three following criteria:

I. it must have an oxidation potential or a reduction potential smaller in absolute value than that of the active organic chemical compound;

II. its oxidized or reduced form must be chemically stable;

III. the reduction or oxidation potential of this oxidized or reduced form (as the case may be) must be less in absolute value than that of the active organic chemical compound, and that reduction or oxidation, as the case may be, must regenerate the starting material.

All of these properties together can be tested by the combination of the two following tests:

(1) there is first plotted the intensity/potential diagram of the material under test in the classical electrochemical conditions referred to above. For example, an electrochemically oxidizable material capable of use as a stabilizing agent must first present a diagram similar to that given in FIG. 2 of the annexed drawings, in which:

the curve 1—1' represents the reduction (i<O) and oxidation (i>O) "walls" of the solvent (acetonitrile in the illustrated case);

the curve 2—2' represents the oxidation (i >O) "wave" of the material under test; there is no reduction of this material in the potential range under study, which is to say down to $-1.6$ V, this potential corresponding to the limiting reduction potential of the solvent acetonitrile. This curve enables determination of the oxidation potential (half-wave potential) of the material under test;

the curve 3—3' is obtained after a preparatory oxidation of the material under test under controlled potential. A diminution of the oxidation "wave" is observed as the result of the diminution of the concentration of the material under test and the apparition of the reduction "wave" of the oxidized form of the material under test is likewise observed. This curve thus enables the determination of the reduction potential of the oxidized form of the material under test (half-wave potential);

the curve 4—4' is obtained after a preparatory reduction of the oxidized form of the material under test under a controlled potential. From this curve, it may be observed that the oxidation "wave" is practically identical to that of the starting material of the material under test; it may be deduced, within the precision of electrochemical measurements, that the material under test is reversibly capable of oxidation-reduction processes and that its oxidized form is chemically stable under the conditions of the test.

For an electrochemically reducible material suitable for use as a stabilizing agent, the intensity/potential diagram to be obtained is of the kind shown in FIG. 3, in which:

the curve 1—1' represents the oxidation-reduction characteristic of the solvent;

the curve 2—2' represents the reduction "wave" of the material under test. There is no oxidation of the latter in the range of potentials under study, that is, up to $+1.5$ V, this potential corresponding to the limiting oxidation potential of the solvent (acetonitrile);

the curve 3—3' represents the oxidation-reduction curve of the material under test and of its reduced form, after a preparatory reduction of the material under test under controlled potential;

the curve 4—4' represents the oxidation-reduction curve of the electrochemical medium after the reduced form of the material under test has been reoxidized by means of a preparatory oxidation under controlled potential. This curve is practically idential to that of the original test material, within the precision of electrochemical measurement.

(2) in a sandwhich-type cell, such as that referred to in connection with FIG. 1, the selected liquid crystal, doped with the tested stabilizing agent (of which the intensity/potential curve fulfills at least one of the forms represented in FIGS. 2 and 3) is subjected to a substantial d.c. voltage (30 to 50 Volts for a liquid crystal thickness of 20 to 50 microns) so as to favor so far as possible the possible degradations. At the end of 300–400 hours, for example 350 hours, the cell is observed to see if at least one of the following phenomena appears:

the electrodes are covered by a relatively opaque deposit and the value of the relative transmission $T_o$ (in absence of electric field) is diminished by at least 10% relative to its original value;

the efficiency of the DSM effect, characterized by the ratio $T_v/T_o$ defined above, has increased by more than 10% compared to its minimum value.

If at least one of these phenomena appears, it may be concluded that the material under test and/or its oxidized or reduced form are not chemically stable. With a negative result in both cases, the material tested is suitable as a stabilizing agent.

With the test conditions above defined, the following electrochemically active materials have been checked to determine whether or not they respond to the totality of the criteria I to III, which materials have been identified with numbers given in parentheses for further discussion and tabulation.

(1) ferrocene having the imperical formula $C_{10}H_{10}FE$;

(2) hexamethoxy-diphenylamine (abbreviated HMDPA) having the structural formula:

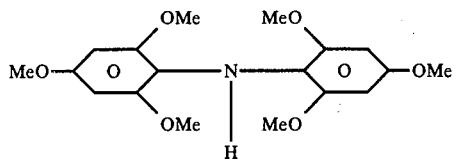

(3) tetracyanoethylene, having the structural formula:

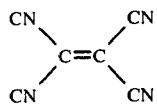

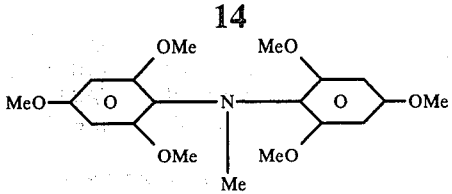

this may also be called hexamethoxy diphenylmethylamine.

The liquid crystal chosen is methoxyphenylazoxybutylbenzene (active organic chemical compound), made available commercially by Merck & Co. under the designation "Merck IV", which has oxidation and reduction potentials respectively of + 1 V and less than − 1.6 V (solvent: acetonitrile).

The experimental results are summarized in Table I.

Notes:

Note 1. In the case of material (1), at the end of 350 hours of operation of the sandwhich cell previously defined, an opaque deposit is observed on the electrodes. $T_o$ has diminished to about 80% in 200 hours. The deposit is attributed to a degradation of the oxidized form of the chosen agent (ferricinium ion). This poor chemical stability of the ferricinium ion is confirmed by the intensity-potential curves of FIG. 4 (traced in the same manner as those of FIG. 2), where it clearly appears that the wave 4—4' attributable to the ferricinium ion, traced after preparatory reduction by application of a current of 2.6 coulombs, 0.2 V, and after a waiting time of 30 minutes, is completely irregular and quite distinct from the wave 2—2' attributable to ferrocene.

Note 2:

As indicated by the intensity/potential curves produced as above described, HMDPA is a material capable of engaging reversibly in oxidation-reduction reactions which satisfy the conditions of the invention.

| Test Material Criteria | (1) | (2) | (3) | (4) | (5) |
|---|---|---|---|---|---|
| I | easy oxidation into ferricinium ion; oxidation potential = + 0.08 Volts | easy oxidation into organic radical cation; oxidation potential = + 0.04 Volts | easy reduction to organic radical anion; reduction potential = − 0.06 Volts | easy oxidation; oxidation potential = + 0.24 Volts | easy oxidation; oxidation potential = + 0.12 Volts |
| II | poor (compare FIG. 4); ferricinium ion reacts with mesomorphic medium | good if no basic impurity is present in the crystal | good | good | good |
| III | easy reduction of ferricinium ion, regenerating ferrocene; reduction potential = − 0.25 Volts | easy reduction of cation, regenerating (2); reduction potential = + 0.04 Volts | difficult oxidation of the anion, regenerating (3); oxidation potential = + 1.3 V, thus higher than that of the active organic chemical compound | easy reduction regenerating (4); reduction potential = + 0.24 Volts | easy reduction regenerating (5); reduction potential = + 0.12 Volts |

(4) tetraphenyl-phenylenediamine, having the structural formula:

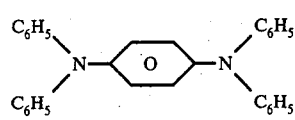

(5) N-methylated HMDPA, of the structural formula:

Indeed, on the one hand an intensity/potential curve is obtained identical to that of FIG. 2; on the other hand at the end of 350 hours, $T_o$ has not changed, while $T_v/T_o$ likewise remains constant with reference to its initial and minimum value. The efficiency obtained for the DSM effect is similar to that given in FIG. 5, explained below.

Note 3:

If the oxidation potential of the liquid crystal is lower than that of the reduced form of the material under test, the former oxidizes before the second, so that the resulting effect is such as occurs in the prior art; there is observed, accordingly, a slow degradation of the doped liquid crystal, identical to that of the undoped liquid crystal. The efficiency of the DSM effect is, in every respect, similar to that shown in FIG. 1.

Note 4:

After 5000 hours of operation with material number (4), no degradation of the liquid crystal was observed and $T_o$ remains constant while $T_v/T_o$ did not vary relative to its initial and minimum value. The totality of these properties can be represented as shown in FIG. 5, with the same conditions as those used in constructing FIG. 1.

Note 5:

For material number (5), the same observations as for the material (4) were made and a curve similar to that of FIG. 5 is obtained.

On the basis of the experiments just described, materials (2), (4) and (5) are suitable for selection as stabilizing agents of the liquid crystal. Of course, other materials are also suitable if they satisfy the tests above defined, interpreted as in the annexed Table I.

The complete stability of the liquid crystal provided in accordance with the invention by the stabilizing agents selected on the basis of the above-specified tests can be appreciated by comparison of FIGS. 1 and 5.

In order to improve the stabilization of a liquid crystal subjected to an electric field, the mesomorphic material may include, in addition to a stabilizing agent having the properties defined and characterized as above set forth, a stabilizing electrolyte comprising:

on the one part, an electrochemically active ion that is chemically stable, constituted by the cationic oxidized form of the stabilizing agent when the latter has the electrochemical property (a) defined above (namely, oxidation and then reduction of the oxidized form to regenerate the stabilizing agent), or constituted by the anionic reduced form of the stabilizing agent when the latter has the electrochemical property (b) defined above (namely, reduction and then oxidation of the reduced form to regenerate the stabilizing agent);

on the other hand, an electrochemically inactive and chemically stable counter-ion. For example, when the stabilizing agent has only the electrochemical property (a) and is either hexametnoxydiphenylamine or N-methylated-hexamethoxydiphenylamine, the ion of the stabilizing electrolyte is a cation identical with the oxidized form, respectively, of hexamethoxydiphenylamine or N-methylated-hexamethoxydiphenylamine, while the counter-ion of the stabilizing electrolyte is an anion identical with the $BF_4^-$ ion or with the $B(C_6H_5)_4^-$ ion.

In this case, the stabilization of the liquid crystal is due to the two following electrochemical cycles which take place concurrently as set forth below:

(1) 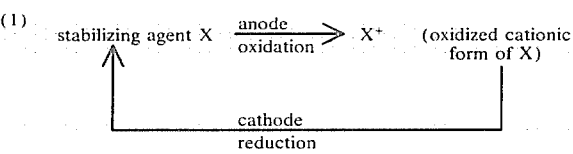

and (2) 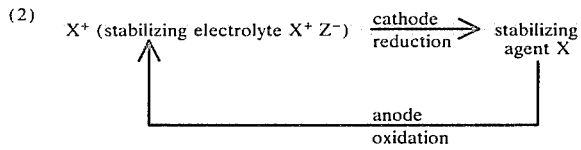

or as set forth in the next two relatins:

(1') 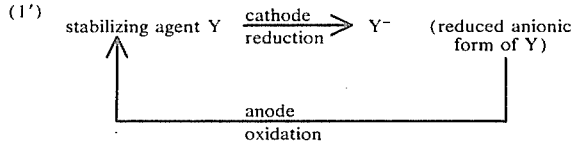

and (2') 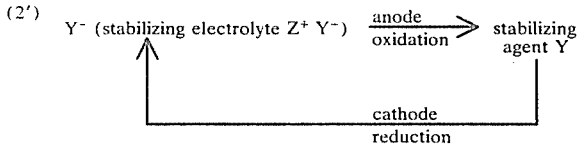

This mode of practicing the present invention makes it possible:

to maintain constant the concentration of the stabilizing agent in oxidized or reduced form, whatever be the manner of operation of the liquid crystal (transitory or permanent); thus, the liquid crystal is protected against any degradation as soon as the cell in which it is located is subjected to applied voltage or otherwise placed in an electric field;

to improve the DSM effect of the liquid crystal by increase of its bulk conductivity.

The practice of the present invention may be carried out in a number of variant forms. Among these various forms, the following may be noted:

(1) As already previously indicated as a possibility, the stabilizing agent is in this case double-acting and presents simultaneously and concurrently the two electrochemical properties denoted and defined as (a) and (b) above, which is to say that it is at the same time oxidizable and reducible electrochemically. In other words, the stabilizing agent chosen in this case exhibits both a reversible oxidation "wave" and a reversible reduction "wave". In this case, the stabilization of the liquid crystal is due to two electrochemical cycles, one of oxidation and the other of reduction, taking place simultaneously and concurrently in accordance with the following cycles:

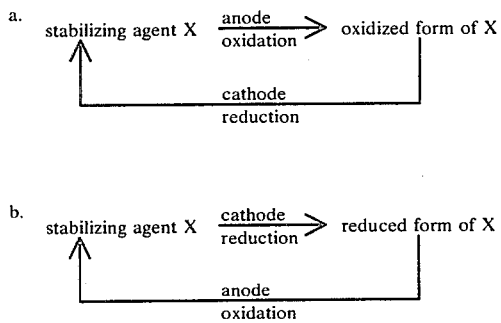

In that case, a double electrochemical reaction takes place at each electrode, one regenerating X and the other giving the oxidized or the reduced form of X.

(2) In the same manner as in the preceding case, the stabilizing agent is double acting, which is to say that it is at the same time oxidizable and reducible electrochemically, but its mode of regeneration does not bring into play electrochemical reactions. In this case, the electrochemically active but chemically stable stabilizing agent exhibits at least the following three properties:

a. in the presence of an anode, the stabilizing agent X is oxidized at an oxidation potential lower than that of any other chemical compound present in the material in the mesomorphic state, including that of the active chemical compound, to produce a cationic oxidized form;

b. in the presence of a cathode, the stabilizing agent is reduced at a reduction potential greater than that of any other chemical compound present in the material that is in the mesomorphic state, including that of the active chemical compound, to produce an anionic reduced form, and c. the aforesaid cationic oxidized form and the aforesaid anionic reduced form react with each other in solution in the aforesaid material to regenerate the stabilizing agent.

In this case, the electrochemical cycle of the stabilizing agent can be diagrammed as follows:

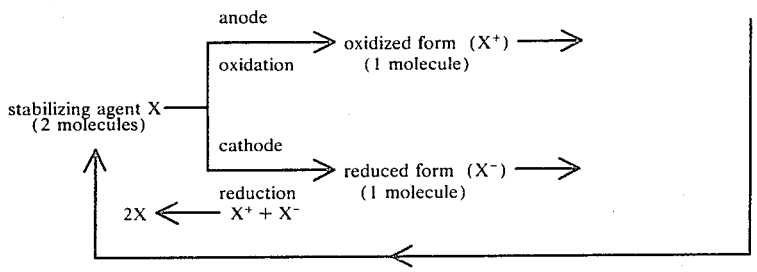

(3) In a manner similar to the preceding case, a single stabilizing agent which is simultaneously oxidizable and reducible electrochemically is replaced by a stabilizing couple or pair of two separate agents, both electrochemically active, respectively oxidizable and reducible in a reversible electrochemical manner. In this case, the stabilizing couple selected exhibits the following properties:

a. in the presence of an anode, one of the agents alone is oxidized, at an oxidation potential lower than that of any other chemical compound present in the material in the mesomorphic state, including that of the active chemical compound, to produce a cationic oxidized form;

b. in the presence of a cathode, the other of the agents alone is reduced, at a reduction potential higher than that of any other chemical compound present in the aforesaid material, including that of the aforesaid active chemical compound, to produce an anionic reduced form, and c. the cationic oxidized form of one of the agents and the anionic reduced form of the other of the agents react with each other, in solution in the aforesaid material, to regenerate both of the electrochemically active agents.

In this case, the electrochemical cycle of the stabilizing couple of agents can be diagrammed as follows:

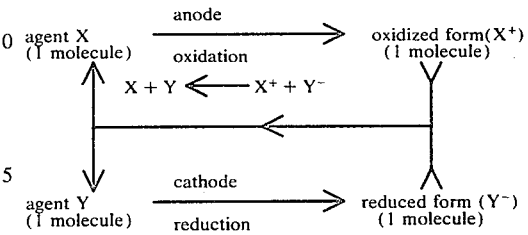

The present invention is applicable to the stabilization of any liquid crystal, with respect to its behavior in an electric field, whether it be a question of a d.c. electric or an alternating one.

We claim:

1. A liquid crystal, comprising at least one active organic chemical compound which is chemically stable and has a substantially elongated molecular configuration, characterized in that the said crystal comprises in addition at least one stabilizing agent capable of preventing degradation of the active organic material when subjected to a d.c. or alternating electric field, which stabilizing is electrochemically active but chemically stable and is reversibly oxidizable-reducible at electrodes in the sense that it presents at least one of the following two electrochemical properties:

a. in the presence of an anode, the stabilizing agent is oxidized at an oxidizing potential lower than that of any other chemical compound present in the said crystal, and that of the said active chemical compound, thereby to provide a cationic oxidized form that is chemically stable; in the presence of a cathode, the oxidized form of the stabilizing agent is reduced at a reduction potential higher than that of any other chemical compound present in the said crystal, and that of said active chemical compound, to regenerate the stabilizing agent, b. in the presence of a cathode, the stabilizing agent is reduced at a reduction potential higher than that of any other chemical compound in the said crystal, and that of said active chemical compound, to provide a reduced anionic form that is chemically stable; in the presence of an anode, the reduced form of the stabilizing agent is oxidized at an oxidation potential lower than that of any other chemical compound present in said crystal, including that of said active chemical compound, to regenerate the stabilizing agent.

2. A liquid crystal according to claim 1, in the pure state, comprising a single active chemical compound, said active chemical compound being in the substantially pure state, characterized in that said oxidation potential is lower than that of said active chemical compound and that said reduction potential is higher than that of said active chemical compound.

3. A liquid crystal according to claim 1, in the impure state, comprising an active chemical compound, and at least one other chemical compound selected from the group consisting of an impurity, an additive and a dopant, characterized in that said oxidation potential is at the same time inferior to that of said active chemical compound and to that of said other chemical compound, and that said reduction potential is higher at the same time than that of said active chemical compound and that of said other chemical compound.

4. A liquid crystal according to claim 1, characterized in that said oxidation potential is equal to or lower than about +1 V.

5. A liquid crystal according to claim 1, characterized in that said reduction potential is higher than or equal to about −1.8 V.

6. A liquid crystal according to claim 1, characterized in that the concentration of the stabilizing agent is from about $10^{-4}$ to about $10^{-2}$ moles per liter.

7. A liquid crystal according to claim 1, characterized in that the stabilizing agent has electrochemical property (a) of claim 1.

8. A liquid crystal according to claim 7, characterized in that the stabilizing agent is selected from the group consisting of tetraphenyl-phenylene-diamine, hexamethoxydiphenylamine, and N-methylated hexamethoxy-diphenylamine.

9. A liquid crystal according to claim 1, characterized in that said material also comprises a stabilizing electrolyte comprising:
an electrochemically active and chemically stable ion constituted by the oxidized cationic form of the stabilizing agent, when the latter has electrochemical properties (a) of claim 1, or constituted by the reduced anionic form of said stabilizing agent, when the latter has electrochemical properties (b) of claim 1, and
an electrochemically inactive and chemically stable counter-ion.

10. A liquid crystal according to claim 9, characterized in that the stabilizing agent has electrochemical properties (a) of claim 1, and is selected from the group consisting of hexamethoxy-diphenylamine and N-methylated hexamethoxy-diphenylamine, while the ion of the stabilizing electrolyte is correspondingly selected from the group of cations consisting of the oxidized form of hexamethoxy-diphenylamine and the oxidized form of N-methylated hexamethoxy-diphenylamine.

11. A liquid crystal according to claim 10, characterized in that the counter-ion of the stabilizing electrolyte is the anion $BF_4^-$.

* * * * *